Nov. 5, 1957  R. B. GOODY  2,812,243
AMBIENT ATMOSPHERE DETECTION APPARATUS
Filed June 18, 1954  4 Sheets-Sheet 1

INVENTOR.
Robert B. Goody
BY Edwin Lensch +
Harry Cole
ATTORNEYS

Nov. 5, 1957  R. B. GOODY  2,812,243
AMBIENT ATMOSPHERE DETECTION APPARATUS
Filed June 18, 1954  4 Sheets-Sheet 2

INVENTOR.
Robert B. Goody
BY
ATTORNEYS

Nov. 5, 1957 R. B. GOODY 2,812,243
AMBIENT ATMOSPHERE DETECTION APPARATUS
Filed June 18, 1954 4 Sheets-Sheet 4

INVENTOR.
Robert B. Goody
BY Edwin Levisohn
Hay Cole
ATTORNEYS

United States Patent Office 2,812,243
Patented Nov. 5, 1957

2,812,243
AMBIENT ATMOSPHERE DETECTION APPARATUS

Robert B. Goody, River Edge, N. J., assignor, by mesne assignments, to the United States of America as represented by the Secretary of the Army Application June 18, 1954, Serial No. 437,632

1 Claim. (Cl. 23—255)

The present invention relates generally to a detection apparatus, and more particularly, to an apparatus for detecting the presence of foreign products or substances in the atmosphere.

More particularly, the present invention provides means whereby any gas or compound containing ammonia, freon, dust particles or any other product present as an aerosol or gas can be facilely and rapidly detected.

In accordance with the present invention, a tape is provided which is coated with a product that is sensitive to the element whose presence is to be detected. Said tape is then subjected to an atmosphere in which the presence of said element is to be detected. Said element activates said tape in accordance with the density of the element present in said atmosphere, after which an indication is provided comparing the density of said element in said atmosphere to a predetermined amount of an allowable density of said element in said atmosphere in order to provide an indication when the density of said element in said atmosphere exceeds a predetermined amount.

The primary object of the present invention is the provision of an apparatus for automatically detecting the presence of a product, aerosol, gas or other element in an atmosphere.

Another object is the provision of an apparatus for indicating when foreign element or toxic substance present in an atmosphere reaches a predetermined density within a predetermined time period.

A further object is to provide an indicating medium which is sensitive to the foreign element or substance and an alarm which is automatically operated after a predetermined activation of the sensitized medium by the foreign element or substance.

The above and other objects, features and advantages of the present invention will be more fully understood from the following description considered in connection with the accompanying illustrative drawings which illustrate the best mode presently contemplated of carrying out the invention.

In the drawings:

Fig. 5 is a schematic diagram of the indicating circuit utilized in the apparatus of Fig. 1;

Figure 1:
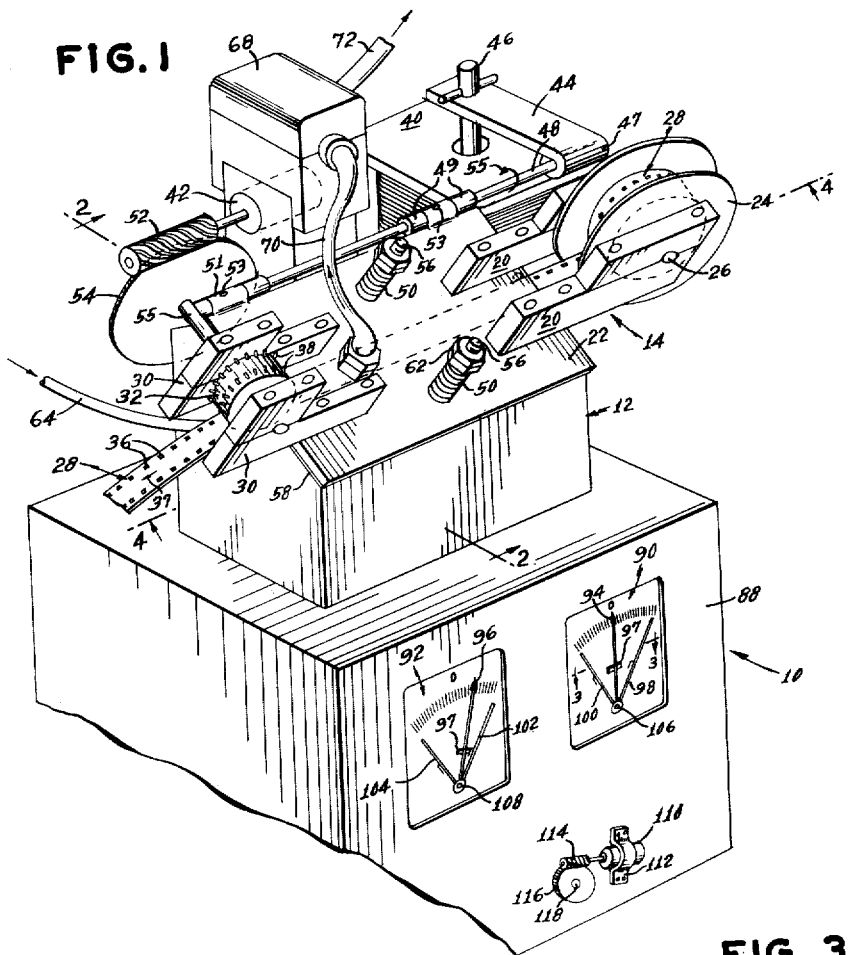
Fig. 1 is a perspective view of an apparatus pursuant to the present invention.
Figure 2:
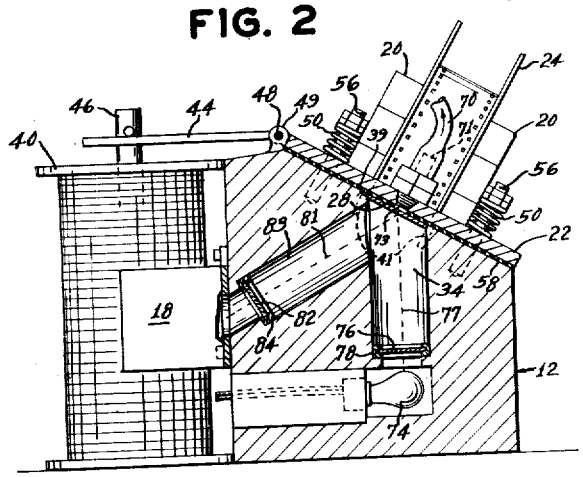
Fig. 2 is a sectional view taken on line 2—2 of Fig. 1.
Figure 3:
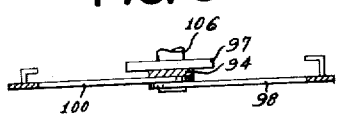
Fig. 3 is a fragmentary sectional view taken on line 3—3 of Fig. 1.

Referring now to Figs. 1-6 of the drawings in detail, which illustrate the presently preferred mode of practicing the present invention, the reference numeral 10 indicates a detection apparatus having, as here shown, an enclosed housing 12 provided with a tape drive mechanism 14.

The tape drive or feed mechanism 14 comprises the spaced brackets 20—20 secured to cover plate 22 of the housing. Brackets 20—20 support a tape supply spool 24 by any suitable means, such as the axle 26 journalled in said brackets 20. A suitable air pervious material, preferably paper is provided on spool 24. At the other end of cover plate 22, provision is made for an additional pair of brackets 30, 30, similar to brackets 20, 20. Brackets 30, 30 support a sprocket wheel 32 which is provided with the projecting pins 38 engageable in the apertures 36 provided in the tape for advancing the tape, which lies in a depression 39 in the housing, in the direction of the arrow 37 from the tape supply. The tape extends from its supply roll past the guide pins 41 and through a chamber 34 defined in the housing 12, being clamped therein by the cover 22.

It will be understood that the tape is advanced intermittently by the sprocket wheel so as to dispose a portion thereof in the chamber 34 between intermittent movements thereof to subject said portion to the element or substance whose presence in the atmosphere is to be detected.

Figure 4:
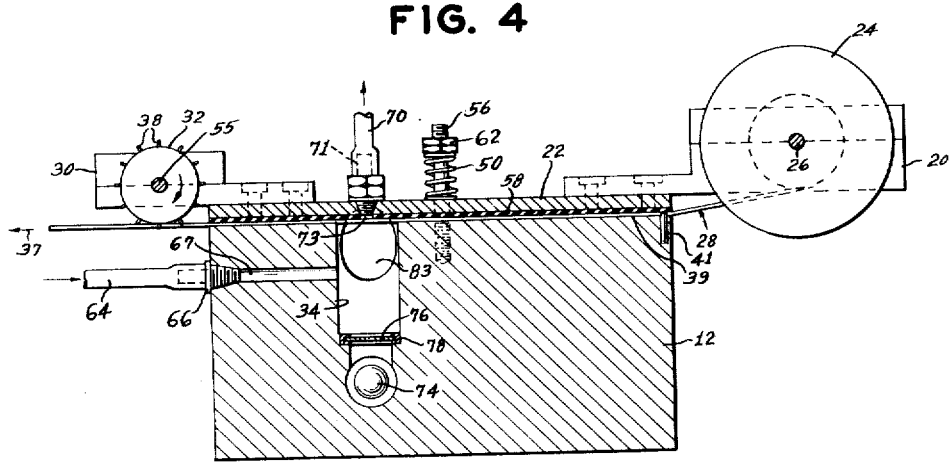
Fig. 4 is a sectional view taken on line 4—4 of Fig. 1.

A solenoid 40, which is carried by housing 12, is provided for lifting cover plate 22 from housing 12, after which a tape moving motor 42 is effective to position another portion of tape 28 in chamber 34. Bracket 44 has one end suitably secured to armature 46 of relay 40 and the other end 47 is looped about and suitably secured to rod 48. The rod 48 is mounted in bearings 49 and extends through loops 51 provided in cover plate 22. The rod is keyed, as at 53, to the cover loops. Consequently, when the armature 46 is retracted, from its projected position illustrated in Fig. 1, by energization of the relay, the rod 48 is rotated in the direction of the arrow 55 to open the cover 22 against the bias of springs 50, 50. Springs 50, 50 are provided on studs 56, 56 which are suitably secured to housing 12 for holding cover plate 22 securely pressed against housing 12 in a fluid-tight relationship. When solenoid 40 is operated, as hereinafter explained, to lift cover plate 22 from housing 12, a tape feed motor 42 which is geared to sprocket wheel 32 through the worm 52, the worm gear 54 and the common shaft 55 of the gear and sprocket wheel, rotates sprocket wheel 32 a predetermined amount to advance the tape in the direction of arrow 37 whereby another portion of the tape 28 replaces the portion previously positioned in chamber 34. In order to further insure the fluid-tight relationship of the portion of tape 28 in chamber 34, a suitable resilient gasket 58 is provided on the underside of cover 22 so that when the cover is in its closed position on the housing 12, the tape is clamped between the underlying portions of the housing 12 and gasket 58 by the springs 50, as illustrated in Fig. 4. When solenoid 40 is energized to open cover plate 22 against the bias of springs 50—50, the latter are compressed against the nuts 62 and are effective to close the cover plate upon de-energization of the solenoid.

A flexible conduit 64, seated on a fitting 66 which extends into a passage 67 which communicates with chamber 34, provides an air supply for the chamber. The outside air is drawn into chamber 34 by means of the vacuum pump 68 which is connected to the chamber 34 through a flexible conduit 70. The conduit 70 is seated on a fitting 71 threaded into an opening in the cover 22. The fitting 71 communicates with the chamber 34, when the cover is closed, through an opening 73 in the resilient seal 58. The tape 28 underlies the opening 73. Consequently, it will be apparent that the pump 68 draws outside air into the chamber 34 through the conduit 64, said air then passing by suction through the air pervious tape into the conduit 70, and from the latter through the pump 68 into the discharge conduit 72.

A suitable light source 74 is disposed relative to chamber 34 to direct light rays to that portion of the tape which underlies the opening 73. If required, as hereinafter explained, the beam 77 produced from said light source can be made to pass through a filter 76 which is properly positioned in housing 12 by filter holder 78. Photo-sensitive means 18, which includes a photo-multiplier tube 80, is positioned at the outlet of a chamber 83 to receive the light rays 81 reflected from tape 28. If desired, filter 82 can be positioned by a suitable filter holder 84, to intercept the reflected rays before they reach the photo-cathode 86 (Fig. 5) of photo-multiplier tube 80. As hereinafter explained in detail, the presence, in the atmosphere, of the particular substance, element or gas which is to be detected, reacts with the tape in such a manner as to decrease or increase, as the case may be, the light rays reflected by the tape, so as to vary the energization of the photo-sensitive means 18.

Positioned on front panel 88 of housing 12 are two zero-center micro-ammeters 90 and 92. Meters 90 and 92 are each respectively provided with a movable indicator needle 94 and 96 having a contact 97, contacting members 98 and 100, and 102 and 104, the purpose of which will be hereinafter further explained. Needle 94 and contacting members 98 and 100 are all rotatably mounted on shaft 106. In a similar manner, needle 96 and contacting members 102 and 104 are rotatably mounted on shaft 108. Also, positioned on the front of panel 88 is a reversible motor 110 for centering needle 94 of zero-center meter 90. Motor 110 is suitably secured on the panel by means of bracket 112. The motor is geared to means 180 (Fig. 5), for setting meters 90 and 92 to zero or any other desired value, through worm 114, which is suitably connected to motor 110, and worm gear 116 which is suitably secured to shaft 118, and through shaft 118 to means 180.

The outputs from the photo-multiplier tube 80 is applied to a comparison circuit 120, which circuit is used to provide a voltage related to the density of the condition or extraneous substance in the atmosphere which is to be detected. The output is taken from anode 122 after dynodes 124A, 124B and 124C have effectively multiplied the number of electrons emitted from cathode 86 as a result of the light reflected from tape 28 impinging on said cathode. While four dynodes are illustrated herein, it will be understood that the photo-multiplier tube 80 may have a greater or lesser number of dynodes, as required. Comparison circuit 120 includes a pair of amplifiers 130 and 140 each having, respectively, an anode 132, 142, a control grid 134, 144, and cathode 136, 146. The anode-cathode current paths of said tubes 130 and 140 are connected across a source of voltage 150 to the terminals B+ and B—. Cathodes 136 and 146 are respectively connected to the B— terminal of voltage source 150 through cathode resistors 137 and 147. Anodes 132 and 142 are respectively connected to the B+ terminal through anode resistors 133 and 143 and through common load resistor 152. One end of resistors 133 and 143 are each respectively connected to one end of resistor 152 and the center point of resistor 152 is connected to the B+ terminal. Also provided are grid resistors 135 and 145 respectively connected between grids 134 and 144 and a source of reference potential or ground potential. The anode 122 of the photo-multiplier 80 is applied to the grid 144 of amplifier 140. Comparison circuit 120 also includes a pair of cathode followers 160 and 170, each having respectively, cathodes 162 and 172, control grids 164 and 174 and anodes 166 and 176. The anode-cathode current paths of tubes 160 and 170 are respectively connected across the source of reference or ground potential and the B+ potential. Connected between the source of reference potential and cathodes 162 and 172 of the cathode followers, respectively, are cathode resistors 168 and 178. Grid 164 is connected to the output of tube 140 between anode 142 and anode resistor 143 and grid 174 is connected to the output of tube 130 between anode 132 and anode resistor 133. The output of cathode followers 160 and 170 is taken across resistors 168 and 178 and applied by means of lines 154 and 156 across meter 90 and meter 92 which are interconnected by line 155.

As was mentioned previously, the output from photo-multiplier 80 is taken from anode 122 and applied to grid 144 of tube 140. Applied to grid 134 of tube 130 is a potential derived from the meter-setting means 180 through line 182. The meter-setting means 180 comprises a heli-potentiometer 181, and a source of voltage 184 having its terminals connected across resistor 186 and the positive terminal 187 connected to a source of reference potential or ground potential. The movable arm 188 of the potentiometer is coupled to shaft 118 which is geared to motor 110 by means of worm 114 and worm gear 116.

The meter setting means 180 is used to zero center or position meter 90, which is a zero contacting meter, and to provide the bias for tube 130 through the setting of arm 188 of heli-potentiometer 181. Circuit 190 is provided for controlling the operation of zero contacting meter 90 and comprises normally cut off tubes 200 and 210, each respectively comprising cathode 202 and 212, a grid 204 and 214 and an anode 206 and 216. Cathodes 202 and 212 are directly connected to needle 94 and line 154. Anodes 206 and 216 are respectively connected through the coils R10 and R20 of relays R1 and R2, respectively, to a common junction and then to the source of potential 150 through contacts R32 of relay R3 to the B+ terminal of source of potential 150. Cathodes 202 and 212 are respectively connected through resistors 203 and 213 to the B— terminal of source 150. Grids 204 and 214 are respectively connected through resistors 205 and 215 to the B— terminal of source 150. It is to be noted that the resistance of resistors 205 and 215 are substantially greater than the resistance of resistors 203 and 213 in order to maintain tubes 200 and 210 normally cut off. Grids 204 and 214 are also respectively connected to contacting members 100 and 98 of zero contacting meter 90. A single pole double throw switch 201 has its movable arm 211 connected to cathodes 202 and 212, and its fixed contacts 207 and 217 respectively connected to contacting members 98 and 100. The purpose for circuit 190 will be hereinafter further explained.

Circuit 220 is provided for controlling the operation of meter 92, which is an indicator meter, and includes tube 222 having a cathode 224, a grid 226 and an anode 228. The anode 228 is connected through coil R40 of relay R4 to the B+ terminal of source of potential 150 and the cathode 224 and grid 226 are respectively connected through resistors 225 and 227 to the B— terminal of source 150. It is to be noted that the resistance of resistor 227 is substantially greater than the resistance of resistor 225 whereby to maintain tube 222 normally cut off. Cathode 224 and grid 226 are also respectively connected through resistors 225 and 227 to line 155. Grid 226 is also connected to contacting member 104.

Figure 6:
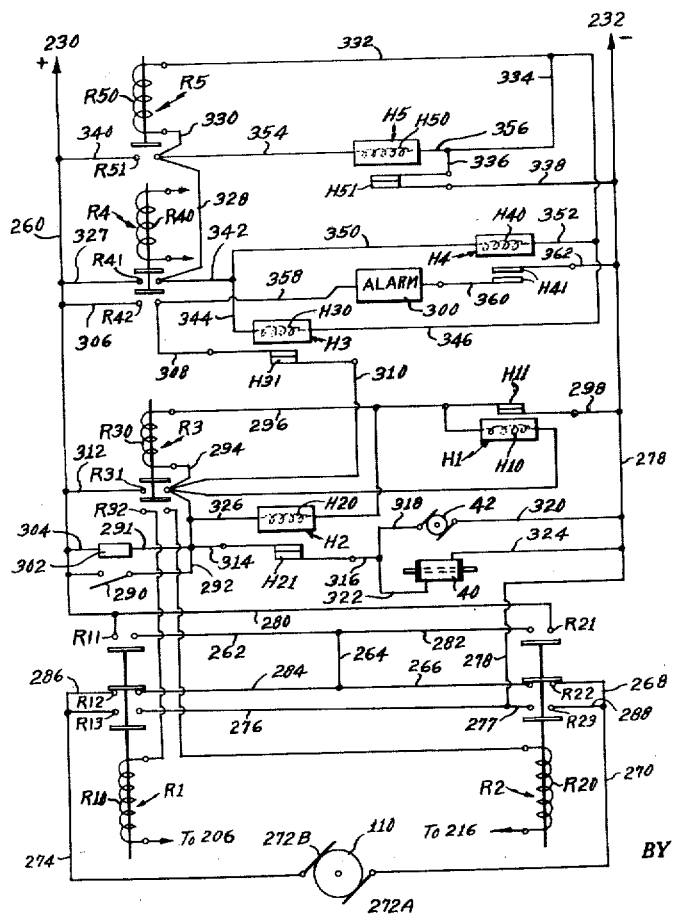
Fig. 6 is a more or less diagrammatic illustration of a timing circuit of the apparatus illustrated in Fig. 1.

All of the control relays are shown in Fig. 6 which comprises five electro-magnetic relays and five thermally operated relays connected across a source of potential having a positive terminal 230 and a negative terminal 232. As pointed out above, the coils R10 and R20 of relays R1 and R2, respectively, are in the zero contacting meter circuit 190 and the coil R40 of relay R4 is in the indicating meter circuit 220. Relay R1 has two normally open contacts R11 and R13 and one normally closed contact R12. In a similar manner, relay R2 also has two normally open contacts R21 and R23 and one normally closed contact R22. Relay R3 has coil R30 and two normally open contacts R31 and R32. Relay R4 has coil R40 and two normally open contacts R41 and R42. Relay R5 has coil R50 and one normally open contact R51. Thermal relays H1, H2, H3, H4, and H5 each respectively have a heater coil H10, H20, H30, H40 and H50 and each respectively have contacts H11, H21, H31, H41 and H51. The contacts of thermal relays H1, H2, H3, and H5 are normally closed and the contacts H41 of relay H4 are normally open. The interconnection and the operation of the various thermal and electro-magnetic relays will be further explained hereinafter.

In the operation of the mechanism, tape 28 is positioned within casing or enclosure 12 underneath cover plate 22 in chamber 34. The tape is properly conditioned to detect a particular substance or impurity in the atmosphere. For example, in order to test for dust particles, a plain white uncoated tape can be used. The dust particles present in the atmosphere darken the tape as air is forced therethrough by the pump 68. The darkening of the tape results in a reduction of the reflected light 81 to change the output of the photo-cell 80. In order to detect various gases or chemicals, the tape 28 can have a coating which reacts to the gases or chemicals in such a manner as to increase or to decrease the amount of light reflected from the tape 28, whereby the energization of photo-cell 80 is increased or decreased with the amount of light reflected from tape 28. Use can also be made of a tape which has a fluorescent coating, the fluorescence of which is changed when subjected to the substance being detected. In this case ultra violet light is used for light source 74. However, if coating on tape 28 is the type that will change color, when subjected to the substance being detected, regular light can be used for the light source 74. For example, when a regulator light source is used and mixed acid vapors are subjected to the tape, said light source and acid vapors will provide a non-fluorescent color change to any pH sensitive paper or tape. Therefore, for the purposes of this invention, light source 74 can be either a normal light source or an ultra-violet light source depending on the element to be detected and the coating of tape 28. Filter 76 and 82 may be used according to whether or not it is desired to filter out any type of light such as ultra-violet light or any type of a colored light. Therefore, it is readily apparent, that applicant's invention can be used to detect any type of condition in an atmosphere by any suitable arrangement of filters, light source 74 and sensitive tapes 28. For example, if tape 28 is red and it will turn blue under the influence of an element in the atmosphere, filter 76 may be a red filter so that only red light will pass from light source 74 to tape 28. Filter 82 can then be a blue filter so that while the tape is still red, no light reaches the photo-multiplier tube 80. However, as the color of tape 28 turns blue under the influence of the condition in the atmosphere, filter 82 then passes only blue light which reaches photo-multiplier tube 80 and causes it to be activated by only the blue light.

As mentioned previously, cover plate 22 is suitably held down on housing 12 by means of springs 50, 50 whereby to provide a fluid-tight chamber. Flexible conduit 64 is placed into the room under test, after which vacuum pump 68 is effective to draw air, any other medium or the atmosphere from the room under test, through conduit 64 through the portion of tape 28 which underlies the opening 73 in the gasket layer 58, and out through conduit 70, through the vacuum pump and out through an exhaust conduit 72. Photo-cathode 86 of photo-multiplier tube 80 is then energized as a result of a change produced in tape 28 by the element in the atmosphere which is being detected, as the air is drawn through tape 28, said change causing the amount of light reflected by the tape from light source 74 to increase or decrease, as the case may be. Photo-multiplier tube 80 has its cathode 86 connected to the negative terminal 240 of a suitable power source 242 and to the common junction of dynode 124A and resistor 244A, and the dynodes 124B and 124C are connected to the common junction of resistors 244A, 244B and 244C, respectively, and then from resistor 244C to the common junction of positive terminal 244 of power supply 242 and the negative terminal 246 of battery 248, the positive terminal 250 thereof being connected to ground or a source of reference potential. Battery 248 is used to supply the current for dynodes 124A, 124B, and 124C. The heli-potentiometer 181 provides a standard voltage which is applied to the grid 134 of tube 130. This standard voltage is used to simulate a predetermined condition of the atmosphere under test. It is to be noted that the heli-potentiometer 181 can be made to simulate a predetermined allowable density of the condition or substance in the atmosphere or to simulate the complete absence of said condition or substance in the atmosphere.

Amplifier 140 should be a very stable amplifier since the amplifier drift would prevent operation of the amplifier since the signal applied from anode 122 of photo-multiplier tube 80 to grid 144 is very small. Amplifiers 130 and 140 are used to amplify, respectively, the voltage applied through line 182 from the heli-potentiometer 181, which simulates a standard condition, and to amplify the voltage from anode 122 of photo-multiplier tube 80. The outputs of tubes 130 and 140 are respectively applied to grids 174 and 164. The conduction of tubes 130 and 140 are changed by changes in the potentials applied to their respective grids. Therefore, the conduction of tubes 160 and 170 are also changed when the voltages applied to grids 134 and 144 are changed. The difference of potential produced between points 151 on cathode 172 and 153 on cathode 162 has a direct bearing and relationship to the relative amount that the element to be detected or conditioned in the atmosphere has caused tape 28 to increase or decrease the amount of reflected light which impinges on photo-cathode 86. For example, assume that the condition in the atmosphere causes the tape to decrease the amount of reflected light. With less reflected light from tape 28, the number of electrons emitted from cathode 86 will decrease and therefore the voltage on anode 122 will increase which in turn increases the potential on grid 144 and thereby increases the conduction of tube 140. The increase in the conduction of tube 140 reduces the potential on grid 164 and therefore decreases the conduction of tube 160. A decrease in the conduction of tube 160 reduces the voltage at point 153. Therefore, the voltage at point 153 decreases as the amount of light reflected decreases. Now, assume that the amount of light reflected from tape 28 increases. Therefore, the number of electrons emitted from cathode 86 will increase the number of electrons picked up by anode 122 which in turn reduces the voltage applied to grid 144. As the voltage applied to grid 144 decreases, the conduction of tube 140 decreases and the potential on anode 142 increases. An increased potential on anode 142 is transferred to grid 164 increasing the conduction of tube 160. An increase in the conduction of tube 160 raises the potential at point 153. Therefore when the amount of light reflected by tape 28 increases the potential at point 153 increases. The potential at point 151 is so regulated that the difference of potential produced between points 151 and 153 when tape 28 is first subjected to the atmosphere containing the condition to be detected, is sufficient to move needle 94 of zero contacting meter 90 so as to make contact with either contacting member 98 or 100, yet it is insufficient to move needle 96 of indicating meter 92 to make contact with contacting member 104. The potential of point 151 can be adjusted by means of heli-potentiometer 181 whereby when the tape 28 produces a predetermined amount of increase or a predetermined amount of decrease in the reflected light, the potential between points 151 and 153 will be a predetermined amount, sufficient enough for needle 96 to be moved over to make contact with contacting member 104. As will be explained hereinafter, an adjustment is provided whereby needle 96 will make contact with contacting member 104, when the density of the condition, or element to be detected, in the atmosphere is a predetermined amount during a predetermined period of time, and also needle 96 will not contact contacting member 104 if the density of the condition in the atmosphere does not reach said predetermined amount during said predetermined period of time.

At the outset of the cycle, when tape 28 is first subjected to the atmosphere containing said condition, a small difference of potential is produced between points 151 and 153, which difference of potential is transferred to zero contacting meter 90 and indicating meter 92 by means of lines 154 and 156. At the outset of the cycle said difference of potential between points 151 and 153 is insufficient to move pointer 96 so as to have it contact contacting member 104. However, said difference of potential is sufficient to move needle 94 so that it will make contact either with contacting member 98 or 100. Assume now that the difference of potential between points 151 and 153 is such that it is sufficient to move needle 94 to the left so that it will contact contacting member 100. Tube 200, which is normally cut off begins to conduct since when needle 94 contacts contacting member 100, resistors 203 and 205 are short circuited whereby grid 204 and cathode 202 are at the same potential thereby allowing tube 200 to conduct. It is to be noted that relay contacts R32 must be closed for tubes 200 and 210 to conduct, and as will be explained hereinafter, said contacts are closed at the outset of the cycle. When tube 200 conducts relay coil R10 of relay R1 is energized thereby closing normaly open contacts R11 and R13 and opening normally closed contacts R12. Motor 110, which is used to properly position arm 188 of heli-potentiometer 181 is then energized through the positive terminal 230 of the power source, line 260, relay contacts R11, through lines 262, 264 and 266, through normally closed contacts R22 of relay R2, through lines 268 and 270 to one terminal 272A of motor 110, and from the other terminal 272B of motor 110, through line 274, through contacts R13, through lines 276 and 278 to the negative terminal 232 of the power supply. When relay R1 is energized and motor 110 moves the arm 188 of heli-potentiometer 181, the voltage at point 151 is altered and may cause needle 94 to move to the right so as to make contact with contacting member 98. When needle 94 contacts contacting member 98, resistors 213 and 215 are short circuited and normally nonconductive tube 210 commences conduction whereby the coil R20 of relay R2 becomes energized. The energization of coil R20 causes normally-open contacts R21 and R23 to close and normally closed contacts R22 to open. Also, since the needle 94 is in contact with contacting member 98, tube 200 which was conducting previously has now been cut off and relay R1 is restored to its normal condition as shown in Fig. 6. The closing of the contacts of relay R2 causes motor 110 to be rotated in a direction opposite to the direction in which it was rotated when relay R1 was closed since the polarity to the poles of motor 110 have been reversed. For example, the circuit to motor 110 is now from the positive terminal 230 through lines 260 and 280, through relay contacts R21 through line 282, through lines 264 and 284, through normally closed contacts R12, through lines 286 and 274, to one terminal 272B of the motor 110, and from the other terminal 272A of motor 110 towards the negative terminal 232 through lines 270 and 288, through relay contacts R23 which are closed when relay R2 is energized, and then through lines 277 and 278 to the negative terminal 232. Relays R1 and R2 will be alternately operated in order to properly position arm 188 to provide the reference voltage at point 151, until relay R3 becomes energized and causes its normally open contact R32, which was closed in order to have tubes 200 and 210 conduct, to again open, and thereby open the circuit for the coils R10 and R20, respectively of relays R1 and R2. The switch 201 is provided for centering the zero centering meter 90 manually. Movable arm 211 and pole 217 are effective to short-circuit resistors 203 and 205 in a manner similar to their short-circuiting by needle 94 and contacting member 100. In a similar manner arm 211 and pole 207 are effective to short-circuit resistors 213 and 215. Tubes 200 and 210 will conduct and operate their respective relays R1 and R2 either when zero-contacting meter 90 or switch 201 is used to short-circuit resistors 203 and 205 for effecting the conduction of tube 200, or resistors 213 and 215 are short-circuited for effecting the conduction of tube 210.

As was mentioned previously, at the outset of the cycle, the tape 28 can be positioned in chamber 34 by manually lifting cover plate 22 from housing 12. However, tape 28 can also be positioned in housing 12 at the outset of the cycle by an automatic means, which makes use of switch 290 which is connected so as to energize paper motor 42 and thereby cause the paper motor to position tape 28 in chamber 34. At the outset of the cycle, relay R3 can be energized as follows, from the positive terminal 230, through line 260, through closed switch 290, through line 292 to one point of contacts R31, to line 294, through coil R30 of relay R3 to line 296, through normally closed contacts H11 of thermal relay H1, through line 298, and then through line 278 to the negative terminal 232. Thermal relay H1 is timed so as to open contacts H11 after a new tape or a new portion of tape 28 has been positioned in chamber 34, and for a sufficient time thereafter to allow relays R1 and R2 to become energized and thereby operate motor 110 to zero the indicating meter 92 by operation of the zero contacting meter 90. An alarm 300, of any suitable type, is provided to give a sound indication when tape 28 has been activated a predetermined amount by the condition in the atmosphere. However, the alarm may provide a visible indication in lieu of, or in addition to, an audible indication. At this point, it is to be noted that the alarm 300 may inadvertently go off when another portion of tape 28 is positioned in chamber 34, such an indication is not valid and is not to be used.

An electro responsive timer 302, of any suitable known type, which may be of the synchronous-motor type, or of the mechanical type, is provided in order to place another portion of tape 28 into chamber 34 of housing 12, when it is desired to provide an inlication that the atmosphere, which is being tested, does not contain a predetermined quantity of the condition to be detected during a predetermined time. Therefore, electro-responsive timer 302 may be made to operate after a few minutes, or after a day or even a week, in order to move a new portion of tape 28 into position in chamber 34. Electro-responsive timer 302 is energized from the positive terminal 230 through lines 260 and 304, to timer 302, and from timer 302 through lines 291, 292 through one point of contacts R31, through line 294, through coil R30 of relay R3, thereby energizing said coil and through contacts H11 through lines 296 and 298, and through line 278 to the negative terminal 232. Consequently, it will be apparent that the timer serves to complete a circuit for energizing both the motor 42 and the solenoid 40 after a predetermined time interval if the tape has not responded sufficiently to the condition being detected to provide for the energization of the motor and solenoid by operation of the indicating meter 92, as hereinafter explained in detail.

Assume now, that the atmosphere applied through conduit 64 to chamber 34 and thence to tape 28 contains a sufficient amount or density of the condition to be detected so as to cause needle 96 of indicating meter 92 to contact contacting member 104. This will occur when the amount of light reflected from tape 28 decreases or increases by a predetermined amount, so as to develop a voltage at anode 122 of photo-multiplier tube 80, which voltage is transferred to grid 144 and thence to grid 164, after which the difference in voltage between points 151 and 153 will reach a predetermined amount, said predetermined amount being sufficient to cause needle 96 to move over and contact contacting member 104. When this occurs, resistors 225 and 227 are short circuited and eliminated from the circuit of tube 220. The short-circuiting of resistors 225 and 227 will cause tube 222 to conduct and thereby energize relay R4. The energization of relay R4 indicates that the condition or element in the atmosphere has reached a predetermined amount during the predetermined period, and therefore it is necessary to position a new portion of tape 28 in housing 12 and into chamber 34 in order to provide for means for repeating and determining again whether or not the condition of density of the condition in the atmosphere will reach a predetermined amount during a predetermined period.

The energization of relay R4 causes normally-open contacts R41 and R42 to close. When R42 closes, a circuit is provided for energizing coil R30 of relay R3 as follows, from positive terminal 230 through lines 260 and 306 through contacts R42 to line 308, through contacts H31, which are closed at this point, through line 310 to said one point of contacts R31, through line 294 through coil R30, through line 296 through contacts H11 through lines 298 and 278, to the negative terminal 232. Relay R3 has its own holding contact R31 for providing a holding circuit for relay R3 which when closed by the energization of relay R3 will remain closed until contacts H11 open. The holding circuit for relay R3 is from the positive terminal 230 through lines 260 and 312, through contacts R31, through line 294, through coil R30, through line 296, through contacts H11, through line 298, through line 278 to the negative terminal 232.

As now constructed, the apparatus requires approximately two seconds for moving a new portion of tape 28 into chamber 34 and, therefore, a circuit is provided for energizing solenoid 40 in order to open cover plate 22 and to simultaneously energize motor 42 for the two second period for moving tape 28. For this purpose, a circuit is provided through relay R4, when it is closed, as follows: From the positive terminal 230 through lines 260 and 306, through contacts R42, through line 308, through contacts H31 through line 310, through said one point of relay R31, through lines 292 and 314, through contacts H21, through lines 316 and 318 to motor 42 and from motor 42 through lines 320 and 278. The circuit for solenoid 40 is similar to the circuit for motor 42 from positive terminal 230 to line 316, and from line 316 to line 322 to solenoid 40 and from solenoid 40 through lines 324 and 278 to the negative terminal 232.

Since, as was mentioned previously, relay R3 has a holding circuit for itself, as soon as relay R4 is energized, the paper motor and solenoid will cause the tape to index itself to a new position even though relay R4 becomes de-energized during the period necessary for the indexing of tape 28. The secondary circuit for indexing tape 28 is provided from the positive terminal 230 through lines 260 and 312 through the closed contacts R31 of relay R3, through line 292, and then to 314, the remainder of the circuit from line 314 being similar to the circuit from relay R4 for indexing tape 28. Also, since thermal relay H2 is energized from line 292, through line 326 to coil H20, and from H20 through line 296, through contacts H11, through line 298, and then through line 278 to the negative terminal 232, said thermal relay H2 can be adjusted to have thermal element H20 open contacts H21 after a sufficient time, which may be two seconds, for the tape to index itself. Contacts R21 will remain open until either relay R3 and R4 are both de-energized or until contacts H11 open.

After tape 28 has been indexed, thermal relay H1 will retain its contacts H11 closed for a period of 15 seconds, after relay R4 is energized, in the present construction of the apparatus, and for 13 seconds after thermal relay H2 causes its contacts R21 to open. During this interval of time, it is noted that contacts H11 are in the holding circuit of relay R3 through contacts R31 whereby to maintain coil R30 energized, from positive terminal 230 to lines 260 and 312 through contacts R31, through line 294, through coil R30, through line 296, through contacts H11, through lines 298 and 278 to negative terminal 232. So long as relay R3 is energized, its contacts R32 will remain closed, and the zero contacting meter circuit 190 will be enabled to operate. It is to be noted that this takes place at the outset of the cycle, just subsequent to the time that tape 28 is positioned or indexed into chamber 34. During this 13 second period, and for the two second period when tape 28 is being moved, needle 94 will be moved from contacting member 100 to contacting member 98 alternately energizing relays R1 and R2 respectively, the purpose for which was heretofore described, in order to move zero centering motor 110 whereby to move arm 188 of the heli-potentiometer 181 whereby to reposition needle 96 of the indicating meter 92 to the zero position. The zero position of indicating meter 92 simulates a standard amount of the condition or element in the atmosphere or any amount of the condition desired to be standardized, even a complete absence of the condition in the atmosphere. After 15 seconds from the time the relay R4 has been energized, thermal relay H1 causes its associated contacts H11 to open, thereby opening the holding circuit for coil R30 of relay R3.

In order to prevent tape 28 from indexing as a result of needle 96 contacting member 104 as a result of or due, for example, to normal meter decay resulting from dirt, dust, battery decay etc., or any other spurious effect, a relay R5, which is a timing relay, is provided. Relay R5 is energized when relay R4 is energized and closes contacts R41. The circuit for coil R50 of relay R5 is from the positive source 230, through lines 260 and 327, through relay contacts R41, through line 328, to one of the contacts R51, through line 330, through the coil R50, through lines 332, 334 and 336 through the normally closed contacts R51, through lines 338 and 278 to the negative terminal 232. Relay R5 has its own holding contact R51, which provides a holding circuit for coil R50 from the positive terminal 230 through lines 260 and 340, through relay contact R51, through line 330, through coil R50, through lines 332, 334 and 336, through thermal relay contacts H51, through lines 338 and 278 to the negative terminal 232. Relay R5 will remain energized so long as thermal relay H51 does not cause its associated contacts H51 to be opened. Relay H5 is used to de-energize relay R5 by opening the circuit for coil R50, and is energized from the positive terminal 230 through lines 260 and 340, through contacts R51, through line 354, through coil H50, through lines 356 and 336, through contacts H51, through lines 338 and 278 to negative terminal 232. Relay H5 can be adjusted to open normally closed contacts H51 for any period of time which is desired. Therefore, relay R5 will remain closed even after the contacts of relay R4 are opened and will remain closed so long as the contacts H51 of thermal relay H5 are closed.

It will be noted that the coils of thermal relays H3, H4 and H5 will be energized and remain energized when contacts R51 are closed and H51 are closed. The circuit for energizing thermal relay H3 is from the positive terminal 230 through lines 260 and 340, through relay contacts R51, through lines 328, 342 and 344, to coil H30 of thermal relay H3, then through lines 346, 334 and 336, through contacts H51, through lines 338 and 278 to the negative terminal 232. The circuit for coil H40 of thermal relay H4 is similar to that of thermal relay H3 up to line 342 after which the circuit goes through line 350 to the thermal coil H40, through lines 352 and 348 after which the circuit is again similar to that of coil H30 of thermal relay H3. It should also be noted that the circuits for coils H30, H40 and H50 of thermal relays H3, H4 and H5, respectively, all go through contacts H51 to the negative terminal 232; however, there are two paths from the positive terminal 230 and line 260, through line 340 and contacts R51, or through lines 260 and 327 and contacts R41, after which line 328 interconnects one point on each of contacts R51 and R41.

Relay H4 can be used to prevent the alarm 300 from providing an indication if the tape 28 is moved at the end of a cycle by means of electro-responsive timer 302, or by means of switch 290, since normally-open contacts H41 can be timed to close at a time which is greater than the time required to index or set a new portion of tape 28 into chamber 34. However, if it is desired to provide an alarm indication when relay R4 closes as a result of the indicating meter needle 96 contacting contact member 104, relay H4 can be adjusted to have its associated contacts H41 close after a period which will insure that relay R4 is not energized spuriously, but as a result of tape 28 being properly activated. Therefore, after relay R51 has been closed, thermal element H40 will heat up and close contacts H41, after a predetermined period, for example and not by way of limitation, such as 20 seconds after relay R4 has been energized to position or index a new portion of tape 28 into chamber 34. Now, should tape 28 again have its reflectivity changed so as to cause the indicating meter 92 to energize relay R4 again there is a circuit for the alarm, and the alarm will provide an indication that the density or condition of the atmosphere has reached a predetermined condition during the predetermined time. The circuit for alarm 300 is provided from the positive terminal 230, through lines 260 and 306, through contacts R42 through line 358, through the alarm 300, through line 360, through contacts H41, the contacts H51 having been closed at this point of the cycle as a result of the previous closing of contacts R42 of relay R4 during the earlier portion of the cycle, through lines 362 and 278 to the negative terminal 232. At this point, it is also to be noted that should a new portion of tape 28 be positioned or indexed as a result of closing switch 290, a spurious alarm indication will be provided, since the circuit closed by switch 290 parallels the circuit to alarm 300 provided by relay contacts R42. The only time when switch 290 will not cause alarm 300 to provide an indication is when contacts H31 have been opened.

In order to prevent solenoid 40 and motor 42 from operating before alarm 300 provides an indication after tape 28 has been indexed as a result of spurious effects, thermal element H30 may be set to operate after two seconds thereby opening contacts H31, whereby should relay R4 again close during the period when thermal relay contacts H51 are still closed, the paper motor 42 and solenoid 40 will not cause the tape 28 to again index, whereby to prevent tape 28 from indexing due to normal meter decay resulting from dust or dirt etc. At any time after thermal relay H41 closes and prior to the time that the contacts H51 open, alarm 300 will produce an indication when the reflective properties of tape 28 have been altered by a predetermined amount whereby relay R4 is energized by the indicating meter 92 short-circuiting resistors 225 and 227 and thereby causing tube 222 to conduct.

Thermal relay H5 can have its thermal element H50 so timed to open up its associated contact H51 at a time after which a proper detection could not be obtained, since there would be no way of knowing whether needle 96 contacted contacting member 104 as a result of the condition in the atmosphere or as a result of normal meter decay caused by dust or dirt, etc., accumulating on the tape. It is to be emphasized that the meter will decay only as a result of tape 28 aging or as a result of tape 28 being unstable and not as a result of any of the circuits being unstable, since they are very stable and will not cause any spurious indication. Once relay contacts H51 are closed as a result of the closing of the relay contacts R41, and a new portion of tape 28 has been positioned in chamber 34, and thermal relay contacts H11 have been opened, the holding circuit for relay R3 is de-energized and relay R3 is removed from the circuit. This usually occurs 15 seconds after relay R4 is energized. Thermal element H40 is now effective to close contacts H41 and thereby place alarm 300 in circuit across terminals 230 and 232, whereby the closing of relay contacts R42, a second time during the cycle, will cause the alarm to provide an indication. Since the thermal element H30 is in series across terminals 230 and 232 through contacts H51, and R51, and since thermal element H30 is adjusted to open contacts H31 after two seconds, the second closing of the contacts of relay R4 during the period contacts H51 are closed, will not cause a new portion of tape 28 to be positioned in chamber 34 of housing 12. Also, should the second time relay R4 close occur after 20 seconds of the first closing of relay R4, the alarm will provide an indication. Should the second time relay R4 be energized occur after thermal element H50 has caused contacts H51 to open, there will be no alarm indication, since the contacts H41 will be opened, and, the contacts H31 will again be closed. Relay H5 can be adjusted to open after a predetermined period. Any indication provided by tape 28 after that period would not be a useful indication, since the tape 28 may have aged or had its characteristics changed. The opening of contacts H51 completes the cycle. Also, as previously set forth, electro-responsive timer or relay 302 is also provided to complete a cycle and position a new portion of tape 28 in chamber 34. Relays H5 and 302 have different functions and purposes. Relay H5 is used to insure that the portion of tape 28 in chamber 34 has not had its characteristics altered. Relay 302 is used to provide a predetermined period during which to determine whether or not tape 28 has been changed a predetermined amount by the condition in the atmosphere. The energization timer or relay 302 has an effect similar to the energization of relay R4, relay 302 providing an indication of the absence of the predetermined amount of the condition during the predetermined period, and relay R4 providing an indication of the presence of the predetermined amount of the condition during the predetermined period. Both relays R4 and 302 are used to commence a new cycle.

A new cycle is commenced when the contacts H51 are opened and relay R4 is again energized, closing its associated contacts. When relay R4 is now again energized, a new portion of tape 28 will be positioned into chamber 34, and the cycle will be repeated, whereby if tape 28 has its reflective properties changed a predetermined amount after the time contacts H41 close and prior to the time contacts H51 open, the alarm will provide an indication and, if the tape 28 does not have its reflective properties changed during the time contacts H51 remain closed, no alarm indication will be provided. A new portion of tape 28 can be again positioned in housing 12 in the following ways: (1) by having relay R4 close as a result of needle 96 contacting member 104; (2) by manually closing switch 290 for closing the circuit to the solenoid 40 and motor 42, (3) or by use of electro-responsive timer relay 302 which, will also close the circuit to motor 42 and solenoid 40. Therefore, it is apparent, that tape 28 can be used to provide an indication as to whether or not the density of the condition in the atmosphere has caused its reflective property to change by a predetermined amount during a predetermined time, and also to indicate the absence of a predetermined amount of said condition in said atmosphere during said predetermined time.

Figure 7:
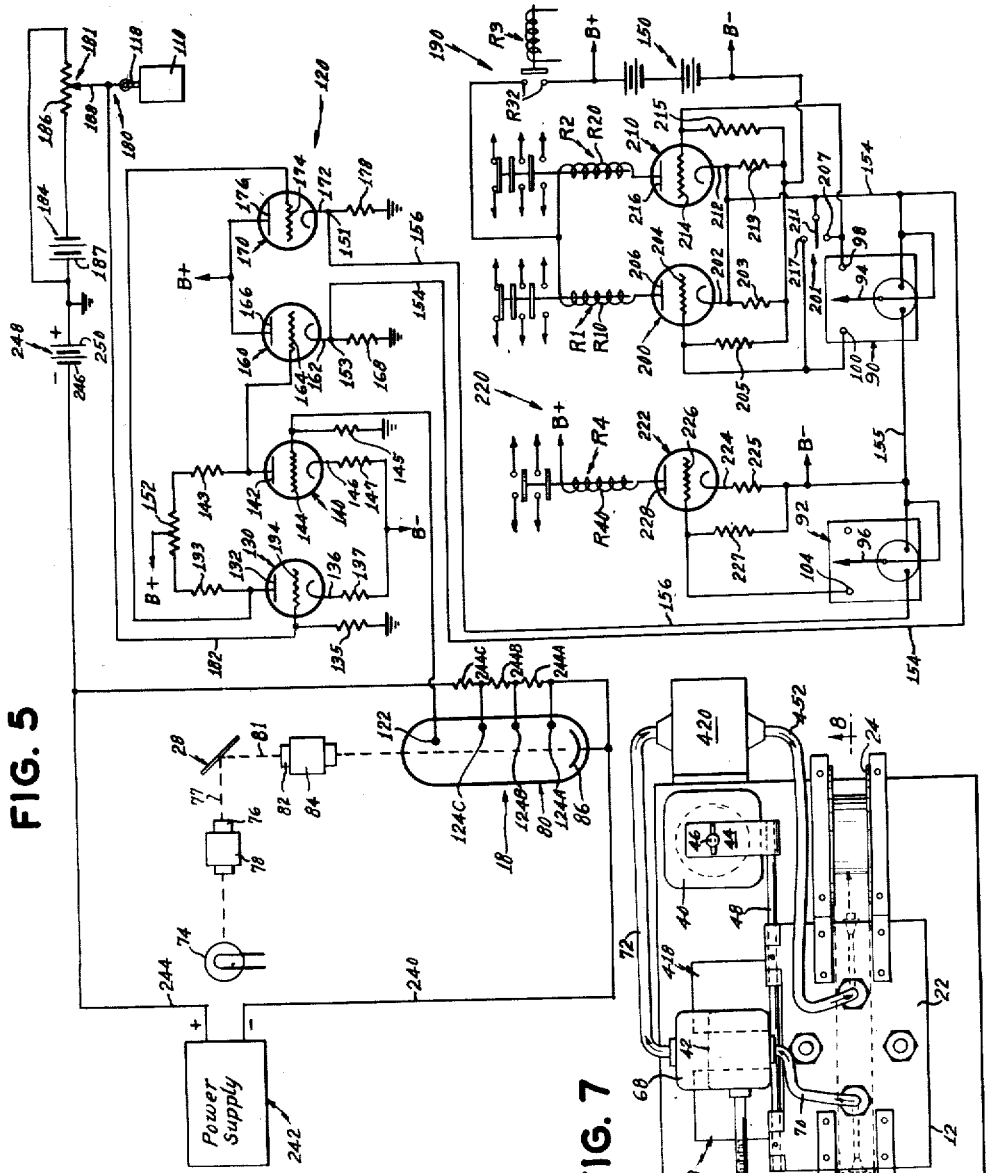
Fig. 7 is a plan view illustrating a modification in the apparatus illustrated in Fig. 1.
Figure 8:
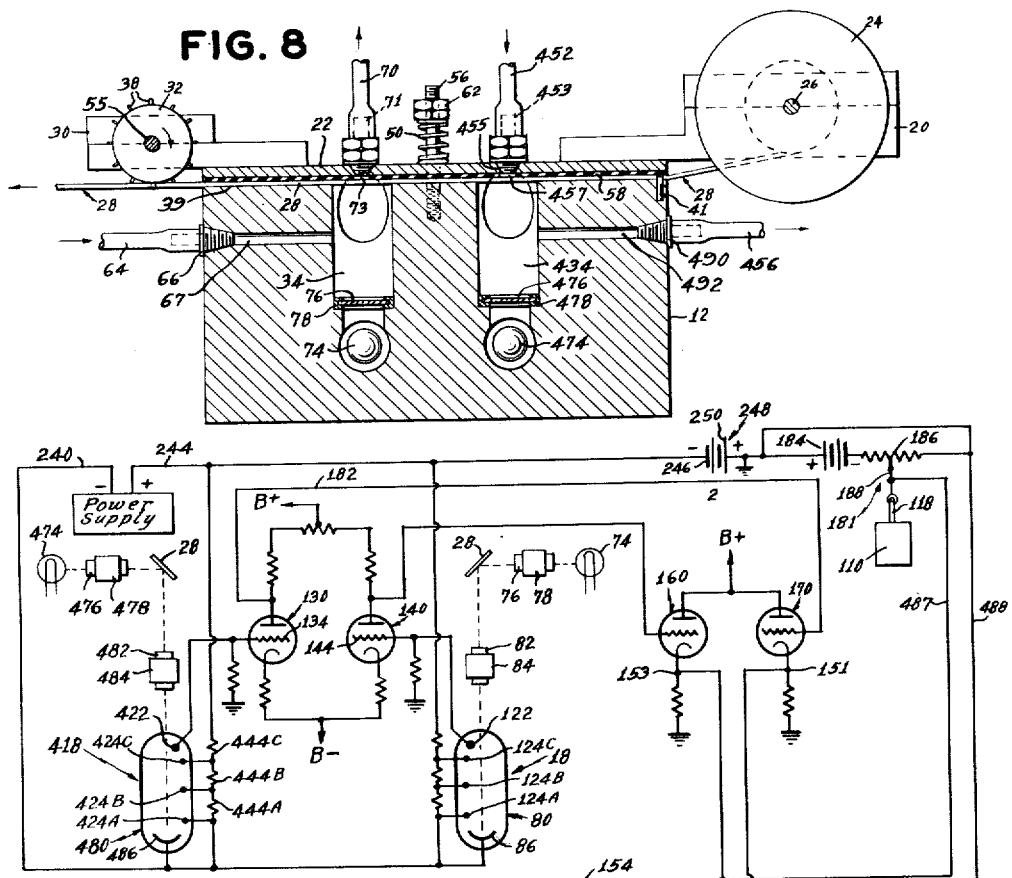
Fig. 8 is a sectional view taken on line 8—8 of Fig. 7.
Figure 9:
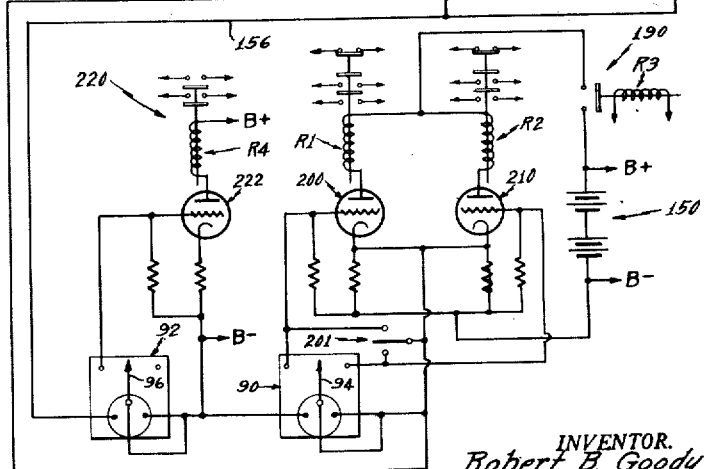
Fig. 9 is a schematic diagram of the indicating circuit utilized in the apparatus of Fig. 7.

Another embodiment of the invention is illustrated in Figs. 7–9, wherein, like parts corresponding to that shown in the embodiment illustrated in Figs. 1–5 have been given corresponding reference numerals. The relay circuit shown in Fig. 6 is used with both embodiments.

The embodiment shown in Figs. 7–9, is used for providing a reference tape conditioned by the atmosphere from which the element to be detected has been removed. Accordingly, the apparatus shown in this modification provides for two chambers 34 and 434 for subjecting tape 28 to the atmosphere and two photo-responsive devices, the previously described means 18 and an additional photo means 418. Accordingly, the apparatus shown in Figures 7–9 differs from the apparatus shown in Figs. 1–5 in the following respects. The exhaust line 72 of the vacuum pump 68 is fed to a filter 420, in which the condition or element in the atmosphere is removed, and the filtered air is then fed by means of conduit 452 to another chamber 434 provided in housing 12. Chambers 34 and 434 are maintained fluid-tight with respect to each other. Conduit 452 is mounted on a fitting 453 threaded into an opening 455 in the cover 22. Said opening registers with an opening 457 in the sealing element 58, the latter opening communicating with the additional chamber 434. Provided in chamber 434 is another suitable light source 474 similar to light source 74, filter 476, and filter holder 478, all of which are similar to filter 76 and filter holder 78. Also provided, as schematically shown in Fig. 9 is a filter 482 and filter holder 484, which are similar to filter 82 and filter holder 84, respectively. Another photosensitive means 418 is provided, similar to photosensitive means 18 which includes a photo-multiplier tube 480 having a photo-cathode 486, dynodes 424A, 424B, and 424C, and associated therewith, resistors 444A, 444B, and 444C. The circuit for photo-multiplier tube 480 is the same as the circuit for tube 80 except that anode 422 of photo-multiplier tube 480 is connected to the grid 134 of tube 130, and the connection 182 from arm 188 of heli-potentiometer 181 is now disconnected from grid 134 and connected directly to line 154, the connection line being denoted 487 in Fig. 9. Also, the common connection of resistor 186 to the positive terminal of battery 184 and the ground or source of reference potential is connected by means of line 488 to line 156. It is to be noted that at the connection of lines 487 and 488 to lines 154 and 156, respectively, are merely a matter of choice, the connections can be interchanged and the apparatus will function properly. Also, photo-multiplier tube 480 may be connected in parallel with tube 80, whereby resistors 444A, 444B and 44C may be eliminated. It is to be emphasized, however, that the output connections from anodes 422 and 22 are connected to grids 134 and 144, respectively.

The indication apparatus shown in Figs. 7–9 is more or less a refinement of the apparatus shown in Figs. 1–5, both of said apparatus using the same relay circuits shown in Fig. 6 and having the same timing sequence. The operation of the apparatus shown in Figs. 7–9 differs from that shown in Figs. 1–5 in a manner which will be described hereinafter. In order to facilitate the explanation, the apparatus shown in Figs. 1–5 will be called the first embodiment and the apparatus shown in Figs. 7–9 will be called the second embodiment.

The second embodiment differs from the first embodiment in that another chamber 434 is provided having an additional light source and photo-sensitive means 418. Tape 28 is positioned in both chambers of the second embodiment and the atmosphere containing the condition is first drawn in through conduit 64 by means of vacuum pump 68 through chamber 34 and through tape 28, which is positioned in chamber 34, out through conduit 70 through the vacuum pump 68 and then instead of being exhausted by means of conduit 72, as in the first embodiment, it is now fed into said filter 420, after which the atmosphere has the condition which is to be detected filtered out, and the filtered atmosphere is then fed to chamber 434 by means of conduit 452, after which the portion of tape 28 in chamber 434 is subjected to the filtered atmosphere, and then the atmosphere is exhausted through outlet conduit 456 provided on fitting 490 in passage 492 which communicates with chamber 434. Both chambers are provided with photo-sensitive means, 18 for chamber 34 and 418 for chamber 434, both anode 122 and anode 422 will produce voltages related to the amount of light reflected by tape 28. As in the first embodiment, anode 122 will produce varying voltages varying in accord with the amount the reflectivity of tape 28 is changed by the condition in the atmosphere, whereas anode 422 will produce a true representation of the atmosphere having the condition removed therefrom, whereby the voltage produced by anode 422 and applied to grid 134 will simulate air atmosphere having absent therefrom the condition to be detected. The output of anode 422 represents an exact standard for a filtered atmosphere. Therefore, in the second modification the voltage difference produced between points 151 and 153 will bear a direct relationship to the amount that tape 28 has its reflective properties changed by the condition in the atmosphere. In the first embodiment, it is to be noted that grid 134 was fed by the heli-potentiometer 181, to provide an output representative of a standard condition. In the second embodiment, the heli-potentiometer is still used for the purposes of centering the needle 96 of the indicating meter 92 by centering the needle 94 of zero contacting meter 90, but it is used in conjunction with the voltage difference produced between point 151 and 153 during the initial interval of its cycle, after which either relay R4 has been energized, switch 290 or electro-responsive relay 302 has caused the motor 42 to position or index a new portion of tape 28 into chambers 34 and 434 of housing 12. Therefore, the voltage produced between points 151 and 153, when combined with the voltage produced by the heli-potentiometer 181 is added by means of lines 487 and 488 to the initial voltage produced by the change in the reflective property of tape 28, are used conjointly to more accurately set the zero position of needle 96 of the indicating meter 92. By use of the second embodiment, a very accurate setting of the zero point or any other reference point of the indicating meter 92 can be obtained. In all other respects, the operation of the second embodiment is similar to the operation of the preferred embodiment.

From the foregoing, it will be readily apparent that various modifications can be made to achieve various specified special applications without departing from the spirit and scope of the invention.

The term contaminant, as used in the appended claims is intended to define, without limitation, any condition, element, suspension, aerosol, solid, and gaseous or liquid medium, whether toxic or not, which may be present in the ambient atmosphere.

While I have shown and described the preferred embodiments and modifications thereof of my invention, it will be understood that various changes and modifications may be made in the present invention without departing from the underlying idea or principles of the invention within the scope of the appended claim.

Having thus described my invention, what I claim and desire to secure by Letters Patent, is:

Apparatus comprising a housing having a pair of chambers defined therein, means for providing an atmospheric flow into one of said chambers and from the latter through the other chamber, means interposed between the outlet of said one chamber and the inlet of said other chamber a filter a predetermined contaminant from said atmospheric flow, means for intermittently feeding a continuous tape through said chambers for subjection to the atmospheric flow therein, photo-sensitive means in said one chamber energized by reflection from the tape portion therein to provide an output responsive to change of said tape portion by the contaminant, photo-sensitive means in said other chamber energized by reflection from the tape portion therein to provide a standard output, and means for operating an alarm circuit in response to a predetermined differential of said outputs.

References Cited in the file of this patent

UNITED STATES PATENTS

| | | |
|---|---|---|
| 2,554,414 | McClendon | May 22, 1951 |
| 2,622,015 | Cooper et al. | Dec. 16, 1952 |

UNITED STATES PATENT OFFICE
CERTIFICATE OF CORRECTION

Patent No. 2,812,243                                      November 5, 1957

Robert B. Goody

It is hereby certified that error appears in the printed specification of the above numbered patent requiring correction and that the said Letters Patent should read as corrected below.

Column 15, line 2, for "a filter" read -- to filter --.

Signed and sealed this 28th day of January 1958.

(SEAL)
Attest:
KARL H. AXLINE
Attesting Officer

ROBERT C. WATSON
Commissioner of Patents